Patented Apr. 12, 1927.

1,624,082

UNITED STATES PATENT OFFICE.

CHARLES O. TERWILLIGER, OF BEACON, NEW YORK, ASSIGNOR TO FRITZ v. BRIESEN, TRUSTEE, OF NEW YORK, N. Y.

RESINS AND PROCESS OF MAKING THE SAME.

No Drawing. Application filed June 29, 1923, Serial No. 648,565. Renewed February 7, 1927.

My invention relates to certain new resins which contain in relation the following substances: A ketonic body, a formaldehyde body and a substance, or a mixture of substances, found in so-called coal tar oils and distillable therefrom above 224° C. but preferably distillable between 224° C. and 300° C. Generally speaking, any one specific group of these substances appears to enter into three, or at least three, specific relations as shown by the fact that in one relation the product is fusible and soluble, in another fusible and insoluble, and in a third infusible and insoluble.

My invention relates, furthermore, to the process by which these resins may be produced, and I desire it to be understood that I claim such process whether or not it is modified so as to produce a different product, and that I claim my new resins whether or not they are produced by the said process.

For producing my new resins, I place in reactive relation a member of each of the following groups of substances:

1. The various products of distillation of so-called coal tar oil distillable above 224° C., or a mixture of such products. I have found as most available for my purpose those products which are distillable between 224° C. and 300° C. and I prefer to use practically all such products, that is to say, the entire fraction which distills off within such range, although I may find it advisable to remove from such fraction, or not to include in such fraction, certain of the substances which belong thereto. It is commonly known that the substances which are distilled off within this temperature range vary according to the particular coal used in producing the original distillate, but this fact is substantially immaterial for my purpose as the difference between the resulting resins with respect to their commercially useful characteristics is so slight as to be of little, if any, practical moment. I have found that if I use the product distillable between 300° C. and 360° C., or include such product in the fraction used by me, I obtain good results but I prefer not to go above 300° C. as, in the ordinary process of refining, mechanical impurities are carried over.

2. Para-formaldehyde, or a water solution of formaldehyde, the latter not so effectively because of its water content. Hexamethylene tetramine which, upon heating, breaks up into ammonia and formaldehyde, may be used in place of either of these two substances. In my claims I group these three substances under the designation "formaldehyde body." As an equivalent I may use furfuraldehyde.

3. A ketone, or mixture of ketones, preferably acetone.

I may use molecular weights of the substance of group 1 and the substance of group 3 but I am not confined to the use of such weights, as I may use as little as one-half or even less, or as much as one and one-half and even more, of the molecular weight of the ketonic body. Of the formaldehyde body I use a proportion, calculated as paraformaldehyde, equal to two-fifths of the total weight of the substances of groups 1 and 3, although this proportion may be varied within certain limits that may be readily ascertained by simple experiment in accordance with the particular nature of the other ingredients.

In order readily to bring about a combination of these substances, I introduce into the mixture thereof an alkaline catalyst such as an alkaline hydroxid or an alkaline carbonate, preferably sodium or potassium hydroxid. The proportion of catalyst is preferably from one-fiftieth to one-tenth of the proportion of its molecular weight to the total molecular weight of the three ingredients to be combined; the proper amount can readily be determined by adding the catalyst to the mixture slowly until the reaction starts and continues satisfactorily. If no catalyst be used the mixture will react if submitted to sufficient pressure and heat, and heat may at times be used profitably if a catalyst is used. An acid catalyst may be used, but I prefer not to use it, as it does not give the best results, and must be removed from the resin as it would attack the metal of the mold.

If the ingredients are allowed to react, they will first form new resins which are soluble and fusible; upon further heating such resins will be converted into resins which are insoluble and fusible, which resins in turn will, upon further heating, be converted into resins which are insoluble and infusible. The insoluble and infusible resins may be used in the manufacture of articles of many kinds, as they have high tensile strength and high di-electric properties. In order to manufacture such articles by molding, the soluble and fusible resin, or the insoluble and fusible resin, is placed into a mold and therein treated with heat to convert it into the insoluble and infusible resin, pressure being applied at the same time. A filler, such as asbestos or sawdust, may be admixed to the resin before it is placed in the mold. The insoluble and fusible resin may be employed in proper solution as a varnish, which after application is heated for conversion into the insoluble and infusible resin.

The following example will illustrate the process by which I produce my resins:

Oil distilled from so-called coal tar oil between 224° C. and 300° C. is preferably first treated, by redistillation or otherwise, to remove tarry matter or free carbon. One hundred (100) parts of such oil are placed with thirty (30) parts of a ketone, preferably acetone, and fifty (50) parts of paraformaldehyde into a suitable vessel provided with heating and cooling means, an agitator and a reflux condenser. To the mixture are added three (3) parts of an alkaline hydroxid, such as sodium or potassium hydroxid, dissolved in as little water as possible, or without water. The contents are agitated for a short time and, if necessary, heat is applied to start the reaction and thereafter, from time to time, to accelerate the reaction if necessary; if the reaction proceeds too violently the vessel should be cooled sufficiently to prevent vapors from escaping from the reflux condenser. If the reaction has proceeded normally, i. e. substantially without violence, the product is a new fusible and soluble resin. To make sure that practically all the ingredients have entered into combination, I prefer, after the reaction is apparently complete, to subject the contents of the vessel to a further heating, for a short time, to a temperature of about 95° C., or less if necessary to prevent conversion of the resin into the insoluble and fusible form.

The resin thus produced may be mixed with a suitable solvent, such as alcohol, benzol or acetone and used as a varnish. The solution is applied to the article to be varnished, and such article is then slowly baked, beginning with normal room temperature, to about 150° C. over a period of approximately five hours or until the resin has been converted into the insoluble and infusible resin.

The resin thus produced may, furthermore, be used for making molded articles. If the article desired is to be translucent, such as a pipe bit, no filler is added and the resin is further heated until it becomes hard when cooled, and, while it is still in the soluble and fusible form, or until it has become converted (as it will upon longer heating) into the insoluble and fusible resin. The hard resin is then ground to desired fineness, placed into a mold and subjected to heat (about 150° C.) until the resin has been converted into the insoluble and infusible state, suitable pressure being applied to compact the material.

If the article desired is to contain a filler (sawdust, asbestos, etc.), such filler may be added to the soluble and fusible resin while it is still in its liquid state, or may be mixed with the ground hard resin, either the soluble and fusible, or the insoluble and fusible, and the mixture then treated in a mold as hereinabove described. I have found equal weights of resin and sawdust suitable for admixture, but it is obvious that the proportion of filler to resin may vary widely. Suitable coloring-matter may be added to the mixture or to the filler.

No ingredients other than those hereinabove referred to are necessary to produce the molded article, and especially no accelerator, or retarder, or wax.

Instead of a single ketone, I find it profitable to use a mixture of ketones such as may be contained in what is known commercially as light or as heavy acetone oils obtained as by-products in the distillation of acetone. The acetone oils give as good results, commercially, as acetone, and are very much lower in price.

By substituting seventy-five (75) parts of the oils, for the hundred (100) parts specified in the above example, and by substituting forty-five (45) parts of the acetone for the thirty (30) parts specified in the above example, I obtain resins similar in behavior, but different in composition, from those obtained by following such example.

As the ingredients do not, in their entirety, enter into reaction, some portion of each ingredient will be left uncombined in the finished resin, and their presence can be detected by the ordinary means of chemical analysis. My resins may be, therefore, identified by reacting to the tests for the ingredients which were used in preparing the same.

While I do not know of any combination of materials selected from these three groups hereinabove specified which, under proper conditions, will not produce one of my new resins, if such a combination should be found I do not include it in my process claims.

When I speak, in my claims, of a high boiling coal tar oil, I refer to one which distills off at 224° C. or above.

I claim:

1. A resin which contains in combination a high boiling coal tar oil, a ketone and a formaldehyde body, and which has been produced by permitting such substances to react simultaneously.

2. A resin which contains in combination a high boiling coal tar oil, boiling at 300° C. or less, a ketone and a formaldehyde body, and which has been produced by permitting such substances to react simultaneously.

3. A resin which contains in combination a high boiling coal tar oil, acetone and a formaldehyde body, and which has been produced by permitting such substances to react simultaneously.

4. A resin which contains in combination a high boiling coal tar oil, boiling at 300° C., or less, acetone and a formaldehyde body, and which has been produced by permitting such substances to react simultaneously.

5. A resin which contains in combination a high boiling coal tar oil, acetone oil and a formaldehyde body, and which has been produced by permitting such substances to react simultaneously.

6. A resin which contains in combination a high boiling coal tar oil, boiling at 300° C. or less, acetone oil and para-formaldehyde, and which has been produced by permitting such substances to react simultaneously.

7. The process of producing resins which comprises causing simultaneously a reaction between a high boiling coal tar oil, a ketone and a formaldehyde body.

8. The process of producing resins which comprises causing simultaneously a reaction between a high boiling coal tar oil, boiling at 300° C. or less, acetone and a formaldehyde body.

9. The process of producing resins which comprises causing simultaneously a reaction between a high boiling coal tar oil, boiling at 300° C. or less, a ketone and a formaldehyde body.

10. The process of producing resins which comprises causing simultaneously a reaction between a high boiling coal tar oil, acetone and a formaldehyde body.

11. The process of producing resins which comprises causing simultaneously a reaction between a high boiling coal tar oil, acetone oil and a formaldehyde body.

12. The process of producing resins which comprises causing simultaneously a reaction between a high boiling coal tar oil, boiling at 300° C. or less, acetone oil and para-formaldehyde.

CHARLES O. TERWILLIGER.